(12) United States Patent
Takeshita (10) Patent No.: US 9,669,496 B2
(45) Date of Patent: Jun. 6, 2017

(54) EXPLOSION-PROOF VALVE AND MANUFACTURING METHOD THEREFOR

(71) Applicant: NOK CORPORATION, Tokyo (JP)

(72) Inventor: Shuji Takeshita, Aso (JP)

(73) Assignee: NOK Corporation (JP)

( * ) Notice: Subject to any disclaimer, the term of this patent is extended or adjusted under 35 U.S.C. 154(b) by 158 days.

(21) Appl. No.: 14/420,574

(22) PCT Filed: Mar. 12, 2013

(86) PCT No.: PCT/JP2013/056698
§ 371 (c)(1),
(2) Date: Feb. 9, 2015

(87) PCT Pub. No.: WO2014/024509
PCT Pub. Date: Feb. 13, 2014

(65) Prior Publication Data
US 2015/0217417 A1    Aug. 6, 2015

(30) Foreign Application Priority Data
Aug. 9, 2012   (JP) ................. 2012-176571

(51) Int. Cl.
*B23P 15/00*   (2006.01)
*H01G 9/12*    (2006.01)
(Continued)

(52) U.S. Cl.
CPC ............. *B23P 15/001* (2013.01); *B23P 19/04* (2013.01); *H01G 9/12* (2013.01); *H01M 2/1229* (2013.01); *Y10T 29/49405* (2015.01)

(58) Field of Classification Search
CPC ................. B23P 15/001; H01G 9/12
See application file for complete search history.

(56) References Cited

U.S. PATENT DOCUMENTS 3,013,190 A * 12/1961 Nieders .................... H01G 9/12
361/521
3,124,488 A * 3/1964 Ruetschi ............. H01M 2/1205
137/493.9

(Continued)

FOREIGN PATENT DOCUMENTS

CN       102187412 A     9/2011
JP       S62-58035 U     4/1987
(Continued)

OTHER PUBLICATIONS

Machine Translation of JP-S62-058035-U1.*
Proto Labs Mar. 2010 Design Tip! "Do the Bump!" <http://www.protolabs.com/resources/injection-molding-design-tips/united-states/2010/03>.*

*Primary Examiner* — Jacob Cigna
(74) *Attorney, Agent, or Firm* — Harness, Dickey & Pierce, P.L.C.

(57) ABSTRACT

An explosion-proof valve installed to a hole portion of a pressure vessel and valve opening when the pressure within the pressure vessel goes beyond a predetermined value so as to release the pressure integrally has a tubular portion inserted to the hole portion, an outside flange portion provided in one end portion of the tubular portion and engaging with an opening peripheral edge portion outside the vessel in the hole portion, a locking projection provided in the other end portion of the tubular portion and engaging with an opening peripheral edge portion in side the vessel in the hole portion, and a membrane portion provided in an inner peripheral side of the tubular portion and rupturing due to the pressure at the valve opening time, and has such a shape that an outer diameter of the outside flange portion is made smaller than an outer diameter of the locking projection.

1 Claim, 6 Drawing Sheets

(51) Int. Cl.
*H01M 2/12* (2006.01)
*B23P 19/04* (2006.01)

(56) References Cited

U.S. PATENT DOCUMENTS

| | | | | |
|---|---|---|---|---|
| 3,992,226 A | * | 11/1976 | Godshalk | H01M 2/1217 220/367.1 |
| 4,328,290 A | * | 5/1982 | Szymborski | H01M 2/1205 429/54 |
| 5,258,243 A | * | 11/1993 | Cannone | H01M 2/127 429/54 |
| 2011/0127694 A1 | | 6/2011 | Kurita et al. | |

FOREIGN PATENT DOCUMENTS

| | | |
|---|---|---|
| JP | H10-050569 A | 2/1998 |
| JP | 2000-306566 A | 11/2000 |
| JP | 2011-119574 A | 6/2011 |

* cited by examiner

EXPLOSION-PROOF VALVE AND MANUFACTURING METHOD THEREFOR

CROSS-REFERENCE TO RELATED APPLICATIONS

This application is a 371 U.S. National Stage Application of International Application No. PCT/JP2013/056698 filed on Mar. 12, 2013, and published in Japanese as WO 2014/024509 A1 on Feb. 13, 2014. This application claims priority to Japanese Application No. 2012-176571 filed on Aug. 9, 2012. The entire disclosures of the above applications are incorporated herein by reference.

BACKGROUND OF THE INVENTION

Field of the Invention

The present invention relates to an explosion-proof valve and a manufacturing method thereof. The explosion-proof valve according to the present invention is installed, for example, to a sealing plate of a capacitor, or installed to various batteries such as a secondary battery.

Description of the Conventional Art

Figure 5:
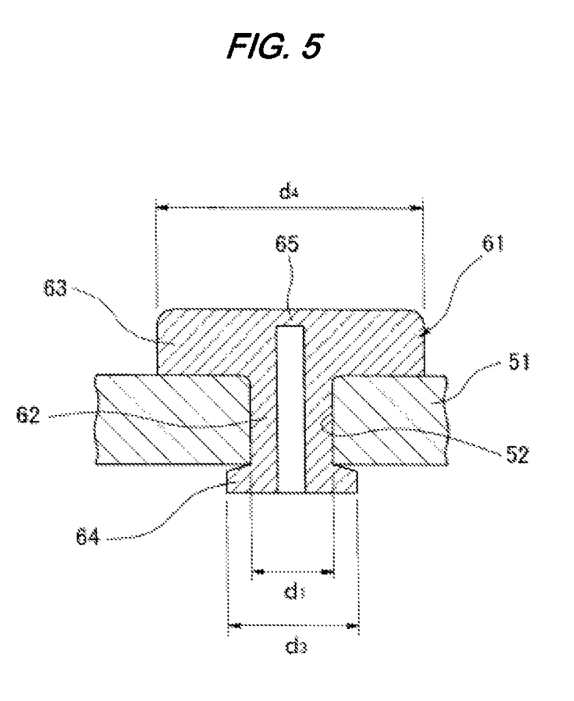
FIG. 5 is a cross sectional view showing an installed state of an explosion-proof valve according to the prior art.

As an explosion-proof valve installed to a pressure vessel for a capacitor and various batteries, there has conventionally known an explosion-proof valve 61 of a type that is installed to a hole portion 52 of a pressure vessel 51 from an outer side (an upper side in the drawing) of the pressure vessel 51. In a structure of the explosion-proof valve 61, a tubular portion 62 inserted to the hole portion 52 is provided, an outside flange portion 63 is provided in one end portion (an outside end portion of the vessel, an upper end portion in the drawing) of the tubular portion 62, a locking projection 64 is provided in the other end portion (an inside end portion of the vessel, a lower end portion in the drawing) of the tubular portion 62, and a membrane portion 65 is provided in an inner peripheral side of the tubular portion 62, the membrane portion 65 valve opening when the pressure (the internal pressure) within the pressure vessel 51 goes beyond a predetermined valve so as to release the pressure (refer to Japanese Unexamined Patent Publication No. 10-050569).

In the explosion-proof valve 61 mentioned above, in order to prevent the explosion-proof valve 61 from separating and detaching from the hole portion 52 of the pressure vessel 51 before the membrane portion 65 ruptures due to rising of the internal pressure, it is necessary to set an outer diameter d3 of the locking projection 64 to be sufficiently greater in relation to an inner diameter d1 of the hole portion 52 (height of the locking projection $64=(d3-d1)/2$).

However, in this kind of conventional explosion-proof valve 61, since an outer diameter d4 of the outside flange portion 63 is set to be further greater than the outer diameter d3 of the locking projection 64, the following disadvantage is generated.

Figure 6A:
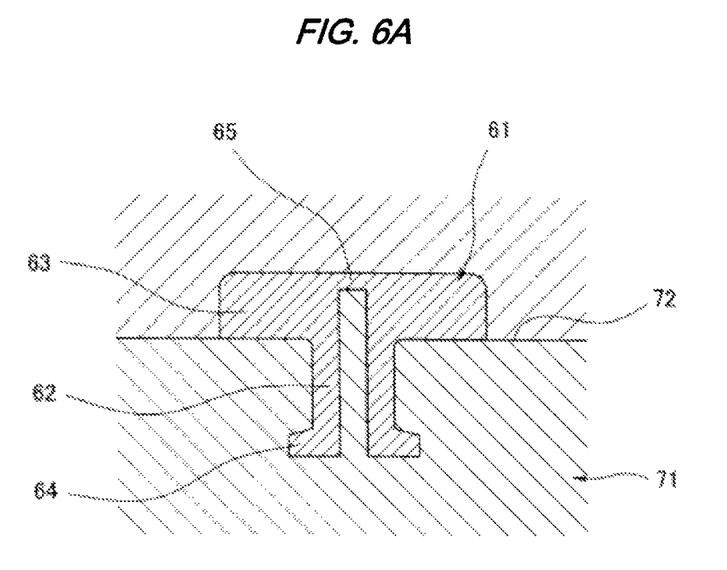
FIG. 6A is a cross sectional view showing a state before a mold opening.

More specifically, as shown in FIG. 6A, in the case that the explosion-proof valve 61 is molded by a molding die having a split structure, the explosion-proof valve is molded by using a molding die 71 in which a mold split position 72 in the split structure is arranged at a position of the outside flange portion 63 in the explosion-proof valve 61 in order to reduce forced extraction positions at the mold releasing time as much as possible.

Figure 6B:
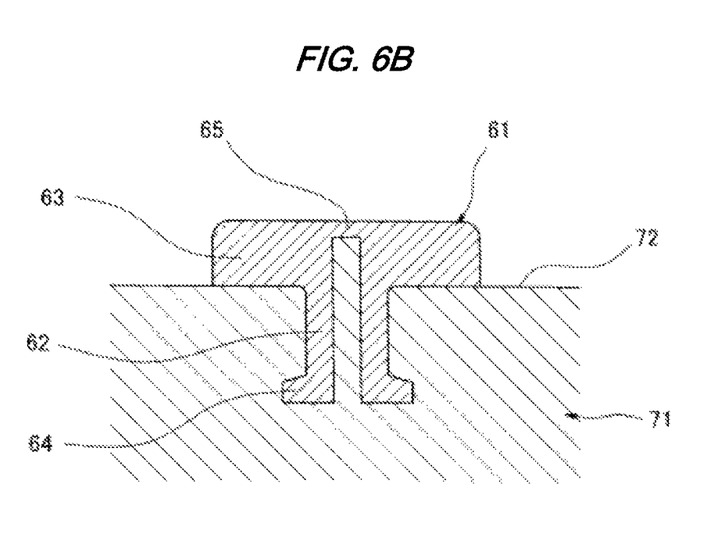
FIG. 6B is a cross sectional view showing a state after the mold opening.

Therefore, in the molding die 71, since the locking projection 64 in the explosion-proof valve 61 is set to the forced extraction position at the mold releasing time as shown in FIG. 6B, the locking projection 64 may be broken at the mold releasing time in the case that the outer diameter d3 of the locking projection 64 is set to be larger as occasion demands (a problem in a valve defective molding)

As a result, conventionally, the outer diameter d3 of the locking projection 64 can not be set to be sufficiently greater. Accordingly, the explosion-proof valve 61 may separate from the hole portion 52 of the pressure device 51 (a problem in a valve detachment).

There can be thought that suppression of defective molding and securement of the outer diameter of the locking projection are achieved by using a molding die having a three-piece split structure (not shown), however, since a die cost is extremely increased in this case, this case can not be an effective countermeasure.

SUMMARY OF THE INVENTION

Problem to Solved by the Invention

The present invention is made by taking the above point into consideration, and an object of the present invention is to provide an explosion-proof valve which can suppress and dissolve both the problem in the valve defective molding and the problem in the valve detachment mentioned above, in spite of the explosion-proof valve which is formed by the molding die of the split structure, and a manufacturing method thereof.

Means for Solving the Problem

In order to achieve the object mentioned above, an explosion-proof valve according to a first aspect of the present invention is an explosion-proof valve installed to a hole portion of a pressure vessel from an outer side of the pressure vessel and valve opening when the pressure within the pressure vessel goes beyond a predetermined value so as to release the pressure, wherein the explosion-proof valve integrally has a tubular portion which is inserted to the hole portion, an outside flange portion which is provided in one end portion of the tubular portion or in the vicinity thereof and engages with an opening peripheral edge portion outside the vessel in the hole portion, a locking projection which is provided in the other end portion of the tubular portion or in the vicinity thereof and engages with an opening peripheral edge portion in side the vessel in the hole portion, and a membrane portion which is provided in an inner peripheral side of the tubular portion and ruptures due to the pressure at the valve opening time, and has such a shape that an outer diameter of the outside flange portion is made smaller than an outer diameter of the locking projection.

Further, a manufacturing method of an explosion-proof valve according to a second aspect of the present invention is an explosion-proof valve manufacturing method of molding the explosion-proof valve according to the first aspect by a molding die having a split structure, wherein the explosion-proof valve is molded by using a molding die in which a mold split position in the split structure is arranged at a position of the locking projection in the explosion-proof valve.

In the present invention having the structure mentioned above, since the explosion-proof valve integrally has the tubular portion, the outside flange portion, the locking projection and the membrane portion, and is formed into such the shape that the outer diameter of the outside flange portion is smaller than the outer diameter of the locking projection, the molding is carried out by using the molding die in which the mold split position in the split structure is arranged at the position of the locking projection in the explosion-proof valve, for reducing the forced extraction position at the mold releasing time as much as possible, in the case that the explosion-proof valve is molded by the molding die having the split structure. Therefore, in the molding die, since the outside flange portion in the explosion-proof valve is set to the forced extraction position at the mold releasing time, and the locking projection is not set to the forced extraction position, it is not necessary to take into consideration damage at the mold releasing time of the locking projection. As a result, it is possible to set the outer diameter (the height in relation to the hole diameter) of the locking projection to be sufficiently great. The manufacturing method of the explosion-proof valve molds the explosion-proof valve by using the molding die in which the mold split position in the split structure is arranged at the position of the locking projection in the explosion-proof valve, as mentioned above.

Further, according to the present invention having the structure mentioned above, in the explosion-proof valve which is installed to the hole portion of the pressure vessel from the outer side of the pressure vessel, the explosion-proof valve is formed so that the outer diameter of the outside flange portion arranged outside the vessel is made smaller than the outer diameter of the locking projection arranged inside the vessel. In this case, the outer diameter (the height in relation to the hole diameter) of the locking projection is set to such a dimension that the locking projection does not detach at the pressure which is equal to or less than the breaking pressure of the membrane portion caused by rise of the internal pressure. On the other hand, the outer diameter (the height in relation to the hole diameter) of the outside flange portion is set to such a dimension as to prevent the explosion-proof valve from being pressed into the vessel due to the negative pressure of the inner portion of the vessel at the beginning of use. Since the pressing due to the negative pressure is generally smaller on the whole in its force acting on the explosion-proof valve in comparison with the pressing due to the rise of the internal pressure, the outer diameter of the outside flange portion is not necessary in comparison with the locking projection. Further, the arrangement of the membrane portion in the inner periphery of the tubular portion is preferably set to the end portion close to the outside flange portion, however, may be set to the intermediate portion of the inner periphery of the tubular portion.

In the present invention, as the molding die molding the explosion-proof valve, it is possible to mold with the mold split by arranging the mold split position at the position of the locking projection and setting the outside flange portion to the forced extraction position at the mold releasing time. In this case, since the split mold in the inner peripheral side of the tubular portion comes off in advance at the mold releasing time (the mold opening time) by arranging the membrane portion in the end portion close to the outside flange portion of the inner periphery of the tubular portion (the one end portion in the axial direction of the tubular portion), it is possible to lighten the load at the mold releasing time which acts on the outside flange portion coming to the forced extraction position. Further, since the pressing due to the negative pressure is smaller on the whole in its force acting on the explosion-proof valve in comparison with the pressing due to the rise of the internal pressure as mentioned above, the outer diameter of the outside flange portion coming to the forced extraction position may be smaller. Therefore, since the outside flange portion is in a state in which the outside flange portion is hard to be broken at the mold releasing time even at the forced extraction position, it is possible to suppress the problem that the explosion-proof valve is broken by the forced extraction at the mold releasing time as a whole.

The arrangement of the membrane portion in the inner periphery of the tubular portion may be set to the intermediate portion of the inner periphery of the tubular portion (the intermediate portion in the axial direction of the tubular portion) as mentioned above, however, since one split mold is left in the outside flange portion side in the inner periphery of the tubular portion at the mold releasing time (the mold opening time) in this case, a slightly great load is applied to the outside flange portion by the forced extraction at the mold releasing time. Further, since the membrane portion does not exist in the inner peripheral side of the outside flange portion and the inner peripheral side of the outside flange portion becomes free, it is easy to deform the outside flange portion, and the locking force is weakened. Therefore, the outer diameter of the outside flange portion which is slightly greater than the negative pressure is necessary. Accordingly, taking these matters into consideration, the arrangement of the membrane portion is preferably set as close as possible to the outside flange portion, and is most preferably set to the end portion in the outside flange portion side. In this case, since the membrane portion exists in the inner peripheral side of the outside flange portion, the deformation of the outside flange portion is hard to be generated, and the locking force becomes greater. Therefore, it is possible to set the outer diameter of the outside flange portion coming to the forced extraction position to be smaller.

Effect of the Invention

The present invention achieves the following effects.

More specifically, in the present invention, since the outer diameter of the outside flange portion is formed to be smaller than the outer diameter of the locking projection as mentioned above, the explosion-proof valve is molded by using the molding die in which the mold split position in the split structure is arranged at the position of the locking projection in the explosion-proof valve so as to reduce the forced extraction position at the mold releasing time as much as possible, in the case that the expansion-proof valve is molded by the molding die having the split structure. Therefore, in the molding die, since the outside flange portion in the explosion-proof valve is set to the forced extraction position at the mold releasing time, and the outside flange portion is formed to have the smaller dimension in its outer shape, the outside flange portion is hard to be broken at the mold releasing time even at the forced extraction position. Accordingly, it is possible to suppress and dissolve the problem that the explosion-proof valve is broken by the forced extraction at the mold releasing time (the problem in the valve defective molding).

Further, since the outside flange portion is set to the forced extraction position at the mold releasing time, and the locking projection is not set to the forced extraction position, it is possible to set the outer diameter of the locking projection to be sufficiently large. Therefore, it is possible to suppress and dissolve the problem that the explosion-proof valve separates from the hole portion of the vessel due to the rise of the internal pressure (the problem in the valve detachment).

Further, in the present invention, since it is possible to employ the molding die having the split structure as the molding die for molding the explosion-proof valve in spite that the effect mentioned above is obtained, it is possible to avoid the increase of the die cost.

BRIEF EXPLANATION OF THE DRAWINGS

FIGS. 2A and 2B are views showing a manufacturing process of the explosion-proof valve, in which

FIGS. 4A and 4B are views showing a manufacturing process of the explosion-proof valve, in which

FIGS. 6A and 6B are views showing a manufacturing process of the explosion-proof valve, in which

DETAILED DESCRIPTION OF PREFERRED EMBODIMENTS

In the prior art in which the outside flange portion is set to the mold split and the locking projection is set to the forced extraction, the mold release is executed in the state in which the die is left in the inner portion of the tubular portion of the explosion-proof valve. Therefore, the load applied to the locking projection becomes great. Further, since the extruding force caused by the rise of the internal pressure is great, it is preferable to make the outer diameter (the height) of the locking projection coming to the forced extraction as large as possible, however, the load caused by the forced extraction becomes greater at that degree. On the contrary, in the present invention in which the locking projection is set to the mold split and the outside flange portion is set to the forced extraction, the die in the inner portion of the tubular portion of the explosion-proof valve comes off in advance at the mold releasing time. Therefore, it is possible to lighten the load at the mold releasing time which is applied to the outside flange portion coming to the forced extraction, and it is possible to suppress the problem such as the breakage. Further, since the pressing force at the negative pressure time is smaller than the extruding force caused by the rise of the internal pressure, it is possible to make the outer diameter (the height) of the forced extracted outside flange portion small.

Embodiments

Next, a description will be given of embodiments according to the present invention with reference to the accompanying drawings.

Figure 1:
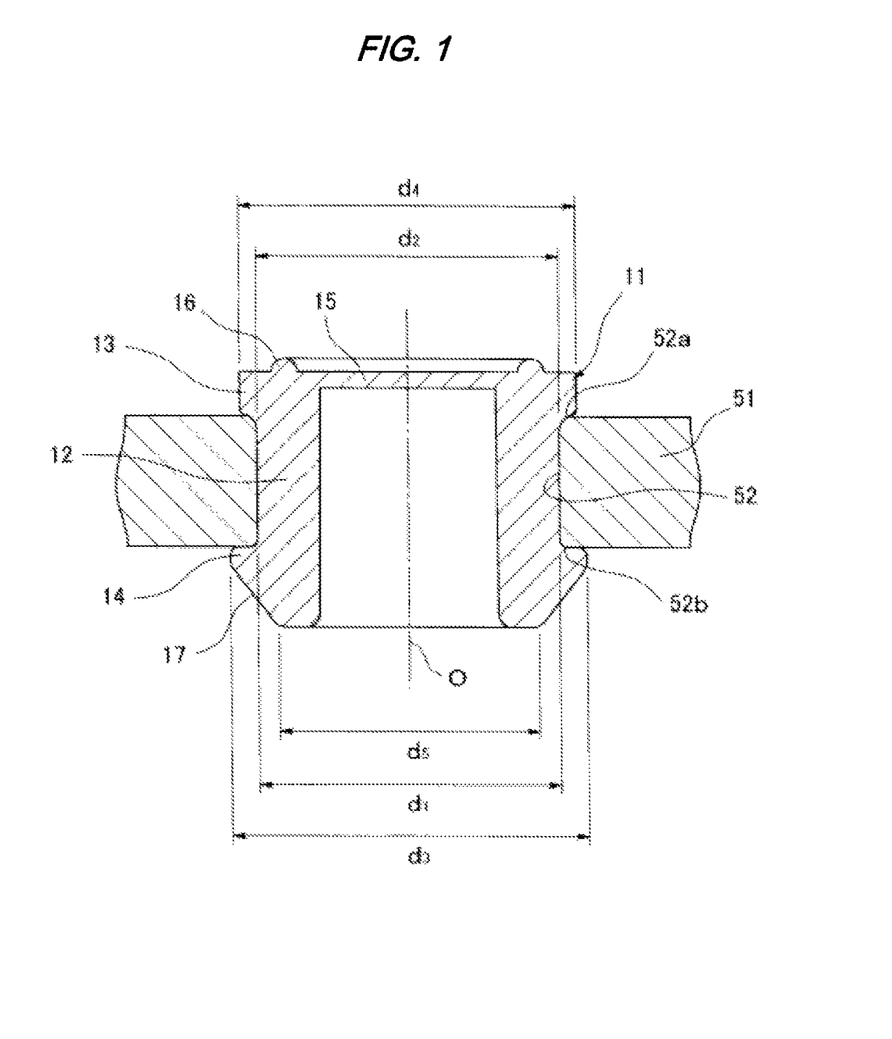
FIG. 1 is a cross sectional view showing an installed state of an explosion-proof valve according to an embodiment of the present invention.

FIG. 1 shows an explosion-proof valve 11 according to an embodiment of the present invention. The explosion-proof valve 11 according to the embodiment is installed to a hole portion 52 of a pressure vessel 51 of a capacitor and various batteries from an outer side of the pressure vessel 51, and valve opens in the case that a pressure (an internal pressure) within the pressure vessel 51 goes beyond a predetermined value (for example, 0.6 to 1 MPa) so as to release the pressure (release to the atmospheric air). The explosion-proof valve 11 may be called as a pressure release valve according to its function.

The explosion-proof valve 1 is integrally formed by an elastic material such as a rubber or a resin, a cylindrical tubular portion 12 inserted to a hole portion 52 is provided as its constructing element, an annular outside flange portion 13 is integrally provided in one end portion in an axial direction of the tubular portion 12 (an end portion outside the vessel, an upper end portion in the drawing), the annular outside flange portion 13 engaging with an opening peripheral edge portion 52a outside the vessel in the hole portion 52, an annular locking projection 14 is integrally provided in the other end portion in the axial direction of the tubular portion 12 (an end portion inside the vessel, a lower end portion in the drawing), the annular locking projection 14 engaging with an opening peripheral edge portion 52b inside the vessel in the hole portion 52, and a membrane portion 15 is integrally provided in an inner peripheral side of the tubular portion 12 and in one end portion in its axial direction, the membrane portion 15 valve opening (rupturing) in the case that an internal pressure goes beyond a predetermined value (for example, 0.6 to 1 MPa) so as to release the pressure (release to the atmospheric air).

Further, a projection 16 is integrally provided in an end surface of the one end portion in the axial direction of the tubular portion 12. Since the explosion-proof valve 11 tends to stick to the periphery at the storing time of the explosion-proof valve 11 single substance and at the assembling time in the product in a flat surface having not projection 16 in the case that the silicone rubber having a high adherence is used as a material of the explosion-proof valve 11, the projection is provided for suppressing the tendency. Further, an annular taper surface 17 formed into a tapering shape is provided in the other side in the axial direction of the locking projection 14. The taper surface 17 is provided for easily installing the explosion-proof valve 11 to the hole portion 52 and easily taking off the explosion-proof valve 11 from the molding die so as to prevent the material in this portion from being scraped. The projection 16 and the taper surface 17 may be omitted, that is, these elements are not essential constructing elements of the present invention.

In a dimensional relationship between diameters of respective constructing elements, an outer diameter d2 of the tubular portion 12 is set to be approximately the same as an inner diameter d1 of the hole portion 52 or set to be slightly larger than the inner diameter d1 of the hole portion 52 for applying a predetermined fitting margin. An outer diameter d3 of the locking projection 14 is set to be larger than the inner diameter d1 of the hole portion 52 and the outer diameter d2 of the tubular portion 12 (d3>d1 and d3>d2). An outer diameter d4 of the outside flange portion 13 is set to be larger than the inner diameter d1 of the hole portion 52 and the outer diameter d2 of the tubular portion 12, and set to be smaller than the outer diameter d3 of the locking projection 14 (d4>d1, d4>d2 and d4<d3). Further, a minimum inner diameter d5 of the taper surface 17, that is, the outer diameter d5 of the end surface in the other end portion in the axial direction of the tubular portion 12 is set to be smaller than the inner diameter d1 of the hole portion 52 and the outer diameter d2 of the tubular portion 12 (d5<d1 and d5<d2).

Figure 2A:
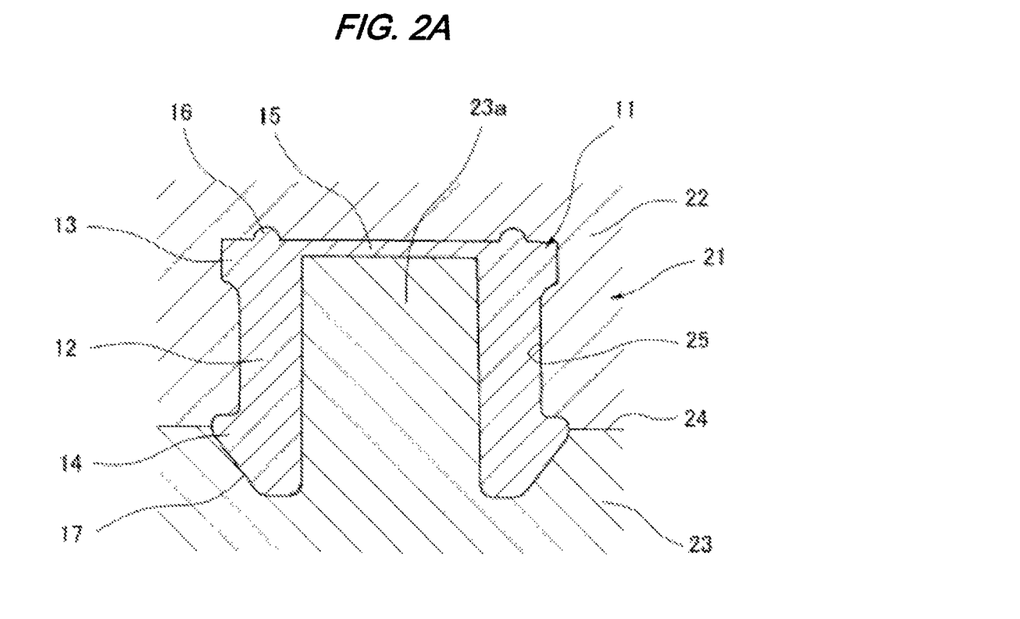
FIG. 2A is a cross sectional view showing a state before a mold opening.

Further, as shown in FIG. 2A, the explosion-proof valve 11 is molded by using a molding die 21 in which a mold split position 24 in a split structure is arranged as a position of the locking projection 14 in the explosion-proof valve 11, for reducing a forced extraction position at the mold releasing time as much as possible in connection with the outer diameter d4 of the outside flange portion 13 being set to be smaller than the outer diameter d3 of the locking projection 14. The molding die 21 having the split structure is provided with two split dies 22 and 23, that is, one split die (an upper die) 22 and the other split die (a lower die) 23, and a cavity space 25 for molding the explosion-proof valve 11 is provided at the mold split position 24 between both the split dies 22 and 23. The mold split position (a split mold parting surface) 24 and a center axis of the cavity space 25, that is, a center axis O (refer to FIG. 1) of the explosion-proof valve 11 are arranged so as to be orthogonal to each other.

Next, a description will be given of a manufacturing method of the explosion-proof valve 11.

Figure 2B:
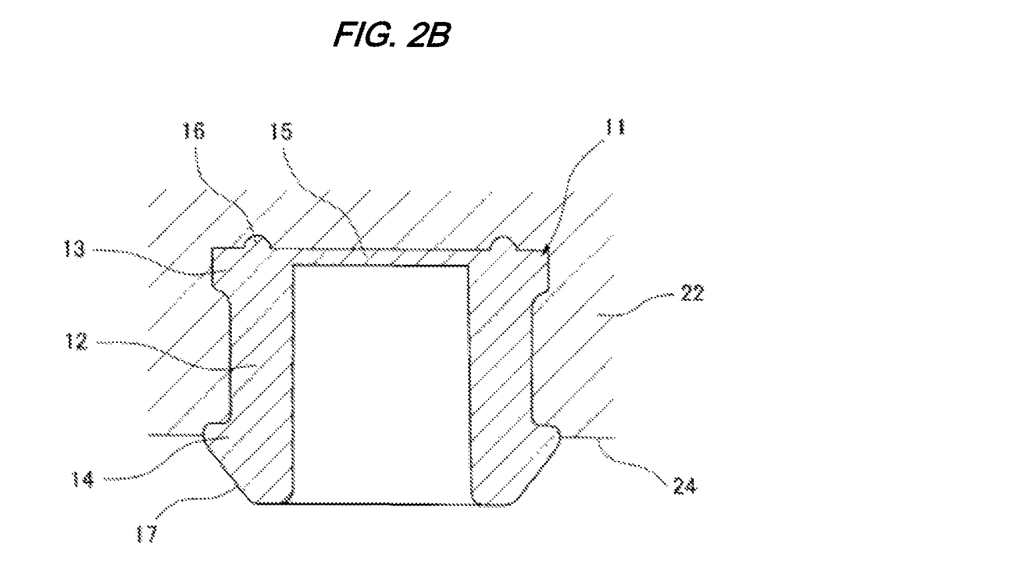
FIG. 2B is a cross sectional view showing a state after the mold opening.

The explosion-proof valve 11 is molded by using the molding die 21 in which the mold split position 24 in the split structure is arranged at the position of the locking projection 14 in the explosion-proof valve 11 as mentioned above. The explosion-proof valve 11 is retained by the one split die (the upper die) 22 having the position molding the outside flange portion 13 and is in a state in which the explosion-proof valve 11 is separated from the other split die (the lower die) 23, by opening the mold as shown in FIG. 2B after molding. Since the other split die (the lower die) 23 is provided with a position 23a which molds an inner peripheral surface of the tubular portion 12 in the explosion-proof valve 11, the tubular portion 12 tends to be elastically deformed toward the inner side in a diametrical direction since the position 23a comes off from the inner periphery of the tubular portion 12. Therefore, the mold release of the explosion-proof valve 11 from the one split die (the upper die) 22 is facilitated.

Since the explosion-proof valve 11 having the structure mentioned above is formed into the shape that the outer diameter d4 of the outside flange portion 13 is smaller than the outer diameter d3 of the locking projection 14, the molding is carried out by using the molding die 21 in which the mold split position 24 in the split structure is arranged at the position of the locking projection 14 in the explosion-proof valve 11, so as to reduce the forced extraction position at the mold releasing time as much as possible in the case that the explosion-proof valve 11 is molded by the molding die having the split structure. Therefore, in the molding die 21, the outside flange portion 13 in the explosion-proof valve 11 is set to the forced extraction position at the mold releasing time, and the outside flange portion 13 is formed into the shape that its outer diameter d4 is small. Therefore, the outside flange portion 13 is hard to be broken at the mold releasing time even if the outside flange portion 13 is set to the forced extraction position. Accordingly, it is possible to suppress and dissolve the problem that the explosion-proof valve 11 is broken by the forced extraction at the mold releasing time (the problem in the defective valve molding).

Further, since the outside flange portion 13 is set to the forced extraction position at the mold releasing time, and the locking projection 14 is not set to the forced extraction position, it is possible to set the outer diameter of the locking projection 14 to be sufficiently large. As a result, it is possible to suppress and dissolve the problem that the explosion-proof valve 11 separates from the hole portion 52 of the vessel 51 due to the rise of the pressure (the internal pressure) within the pressure vessel 51 (the problem in the valve detachment).

Further, in the present embodiment, it is possible to employ the molding die 21 having the split structure as the molding die molding the explosion-proof valve 11 in spite that the problem in the defective valve molding and the problem in the valve detachment are suppressed and dissolved as mentioned above. Therefore, it is possible to avoid the problem in the die cost increase which is generated in the case of using the molding die having the three-piece split structure.

Further, in the present embodiment, since the membrane portion 15 in the inner peripheral side of the tubular portion 12 is provided in the one end portion in the axial direction of the tubular portion 12, the other split die (the lower die) 23 having the position 23a molding the inner peripheral surface of the tubular portion 12 comes off from the inner periphery of the tubular portion 12 approximately over the entire length in the axial direction of the tubular portion 12 (more accurately the length obtained by subtracting a thickness of the membrane portion 15 from the axial length of the tubular portion 12), by mold opening as shown in FIG. 2B after the molding. Therefore, since the tubular portion 12 tends to be elastically deformed toward the inner side in the diametrical direction, the mold release of the explosion-proof valve 11 from the one split die (the upper die) 22 can be facilitated.

Figure 3:
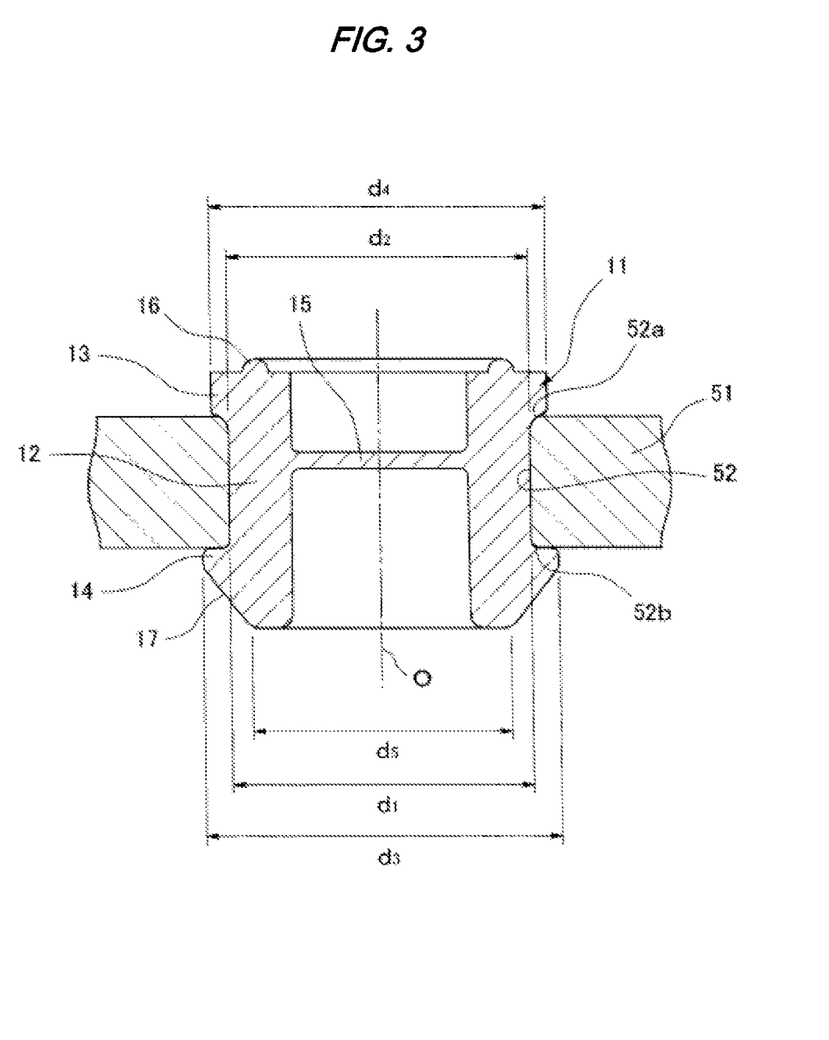
FIG. 3 is a cross sectional view showing an installed state of an explosion-proof valve according to the other embodiment of the present invention.
Figure 4A:
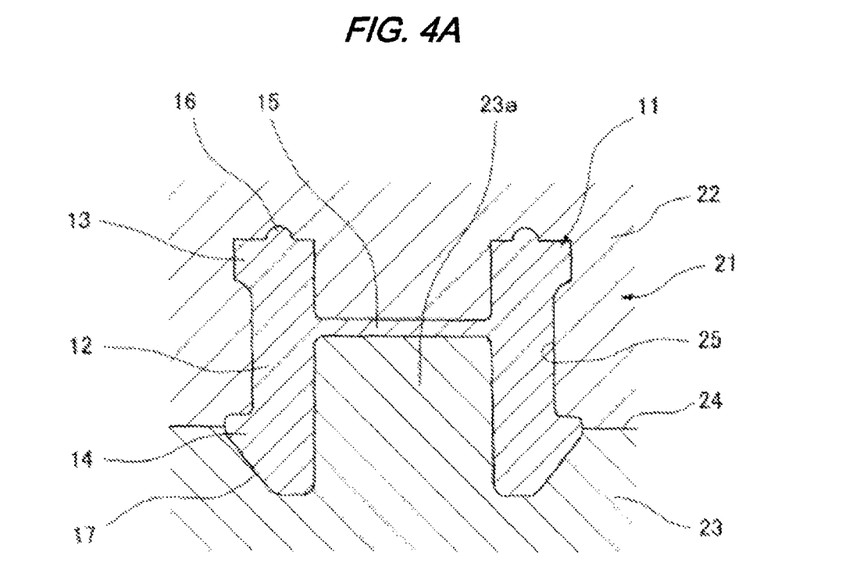
FIG. 4A is a cross sectional view showing a state before a mold opening.
Figure 4B:
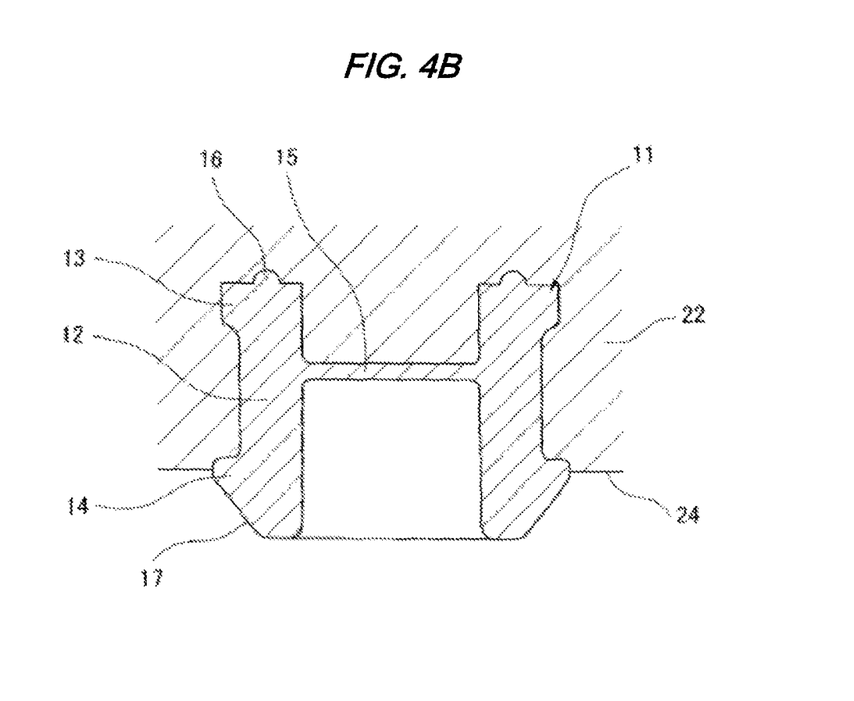
FIG. 4B is a cross sectional view showing a state after the mold opening.

In the present invention, the arrangement of the membrane portion 15 is not limited to the one end portion in the axial direction of the tubular portion 12, but may be set to the intermediate portion in the axial direction of the tubular portion 12. In FIGS. 3 and 4 which are shown as the other embodiments of the present invention, the membrane portion 15 is provided in the intermediate portion in the axial direction of the tubular portion 12, advantages and disadvantages of this case are as described in the paragraph 0016 in means for solving the problem. Further, since the other structures, and operations and effects in the other embodiments are the same as those of the embodiment mentioned above, a description thereof will be omitted by attaching the same reference numerals.

What is claimed is:

1. A manufacturing method of an explosion-proof valve installed to a hole portion of a pressure vessel from an outer side of said pressure vessel and valve opening when the pressure within said pressure vessel goes beyond a predetermined value so as to release said pressure, the explosion-proof valve integrally having a tubular portion which is inserted to said hole portion, an outside flange portion which is provided in one end portion of said tubular portion or in a vicinity thereof and engages with an opening peripheral edge portion outside the vessel in said hole portion, a locking projection which is provided in an opposite end portion of said tubular portion or in a vicinity thereof and engages with an opening peripheral edge portion inside the vessel in said hole portion, and a membrane portion which is provided in an inner peripheral side of said tubular portion and ruptures due to said pressure at the valve opening time, the explosion-proof valve being set such that an outer diameter of said outside flange portion is larger than an inner diameter of said hole portion and an outer diameter of said tubular portion and is smaller than an outer diameter of said locking projection, and the outer diameter of said locking projection is larger than the inner diameter of said hole portion and the outer diameter of said tubular portion, the manufacturing method comprising:

moulding the explosion-proof valve using a molding die having a split structure, wherein the locking projection has an annular surface that engages with the opening peripheral edge portion, and a tapered surface that radially narrows along a length thereof in a direction toward the opposite end portion, wherein a mold split position of the split structure in said molding die is arranged at a position of said locking projection in said explosion-proof valve between the annular surface that engages with the opening peripheral edge portion and a location where the tapered surfaces begins to radially narrow, and wherein said outside flange portion is forcedly extracted from said molding die after molding said explosion-proof valve by using said molding die and mold opening.

* * * * *